(12) United States Patent
Hsu et al.

(10) Patent No.: US 12,141,624 B2
(45) Date of Patent: Nov. 12, 2024

(54) STABILIZING PERFORMANCE OF PROCESSING DEVICES

(71) Applicant: Hewlett-Packard Development Company, L.P., Spring, TX (US)

(72) Inventors: Chun Jung Hsu, Taipei (TW); Hsih Sung Hsu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 551 days.

(21) Appl. No.: 17/059,579

(22) PCT Filed: Jan. 8, 2019

(86) PCT No.: PCT/US2019/012607
§ 371 (c)(1),
(2) Date: Nov. 30, 2020

(87) PCT Pub. No.: WO2020/145943
PCT Pub. Date: Jul. 16, 2020

(65) Prior Publication Data
US 2021/0326188 A1 Oct. 21, 2021

(51) Int. Cl.
*G06F 9/50* (2006.01)
*G06F 1/20* (2006.01)
(Continued)

(52) U.S. Cl.
CPC ............ *G06F 9/5094* (2013.01); *G06F 1/206* (2013.01); *G06F 1/3237* (2013.01); *G06F 1/3296* (2013.01)

(58) Field of Classification Search
None
See application file for complete search history.

(56) References Cited

U.S. PATENT DOCUMENTS 8,006,108 B2  8/2011  Brey et al.
8,086,884 B2  12/2011  Naffziger
(Continued)

FOREIGN PATENT DOCUMENTS

CN  101171564 A  4/2008
CN  104115093 A  10/2014
(Continued)

OTHER PUBLICATIONS

Brooks et al.; "Dynamic Thermal Management for High-Performance Microprocessors"; IEEE 2001; (Brooks_2001.pdf; pp. 171-182) (Year: 2001).*

(Continued)

*Primary Examiner* — Hiren P Patel
(74) *Attorney, Agent, or Firm* — Quarles & Brady LLP

(57) ABSTRACT

A method of stabilizing performance of a processing device may include determining a maximum operational temperature of any number of cores of a processing device from a thermal control circuit of the processing device; setting a maximum power based on a maximum thermal capacity of the processing device to a power lower than the maximum operational temperature; increasing the power provided to the processing device when the maximum thermal capacity is below a set temperature; and placing the power provided to the processing device to an intermediate power level relative to the operational temperature and the maximum thermal capacity when operations of the processing device are to exceed the operational temperature of any of the cores of the processing device.

20 Claims, 4 Drawing Sheets

(51) Int. Cl.
   *G06F 1/3237* (2019.01)
   *G06F 1/3296* (2019.01)

(56) References Cited

U.S. PATENT DOCUMENTS

| | | | | |
|---|---|---|---|---|
| 8,786,449 | B1* | 7/2014 | Kraipak | G06F 1/206 |
| | | | | 702/132 |
| 8,788,859 | B2 | 7/2014 | Cai | |
| 8,793,512 | B2* | 7/2014 | Branover | G06F 1/206 |
| | | | | 327/512 |
| 9,032,223 | B2 | 5/2015 | Rotem et al. | |
| 9,063,785 | B2* | 6/2015 | Bodas | G06F 9/5094 |
| 9,524,012 | B2 | 12/2016 | Khatri et al. | |
| 9,652,019 | B2 | 5/2017 | Dongara et al. | |
| 10,509,449 | B2* | 12/2019 | Nguyen | G06F 1/324 |
| 10,817,039 | B2* | 10/2020 | Nguyen | G06F 1/329 |
| 10,911,634 | B2* | 2/2021 | Ito | H04N 1/00082 |
| 11,188,379 | B2* | 11/2021 | Kraemer | G06F 1/3243 |
| 11,262,832 | B2* | 3/2022 | Lin | G06F 1/28 |
| 11,709,529 | B2* | 7/2023 | Chialastri | G06F 1/324 |
| | | | | 700/300 |
| 11,709,627 | B2* | 7/2023 | Fujimori | G06F 3/0679 |
| | | | | 711/103 |
| 2005/0060589 | A1* | 3/2005 | Athas | G06F 1/3203 |
| | | | | 713/300 |
| 2005/0071705 | A1* | 3/2005 | Bruno | G06F 1/206 |
| | | | | 713/500 |
| 2005/0210905 | A1* | 9/2005 | Burns | G06F 1/324 |
| | | | | 257/E23.08 |
| 2006/0004538 | A1* | 1/2006 | Cancel | G06F 1/206 |
| | | | | 702/136 |
| 2009/0172450 | A1 | 7/2009 | Wong et al. | |
| 2009/0235108 | A1* | 9/2009 | Gold | G06F 1/324 |
| | | | | 713/500 |
| 2010/0064162 | A1* | 3/2010 | Rotem | G06F 1/206 |
| | | | | 713/340 |
| 2012/0066535 | A1* | 3/2012 | Naffziger | G06F 1/3203 |
| | | | | 713/340 |
| 2012/0102348 | A1 | 4/2012 | Muralidhar et al. | |
| 2012/0110352 | A1* | 5/2012 | Branover | G06F 1/206 |
| | | | | 713/300 |
| 2013/0117590 | A1* | 5/2013 | Allen-Ware | G06F 1/206 |
| | | | | 713/320 |
| 2013/0159741 | A1 | 6/2013 | Schluessler et al. | |
| 2013/0328890 | A1 | 12/2013 | Avkarogullari et al. | |
| 2013/0332753 | A1* | 12/2013 | Varma | G06F 1/3287 |
| | | | | 713/300 |
| 2014/0086053 | A1* | 3/2014 | Noro | G06F 1/324 |
| | | | | 370/235 |
| 2015/0331433 | A1* | 11/2015 | Naffziger | G06F 1/324 |
| | | | | 700/300 |
| 2016/0034009 | A1* | 2/2016 | Wang | G06F 1/206 |
| | | | | 713/300 |
| 2016/0070627 | A1 | 3/2016 | Huang et al. | |
| 2016/0147280 | A1* | 5/2016 | Thomas | G06F 1/3243 |
| | | | | 713/320 |
| 2016/0266628 | A1* | 9/2016 | Jain | G01K 13/00 |
| 2016/0274629 | A1* | 9/2016 | Lovicott | G06F 1/206 |
| 2017/0131754 | A1* | 5/2017 | Zobel | G06F 1/3206 |
| 2017/0264493 | A1 | 9/2017 | Cencini et al. | |
| 2017/0285700 | A1 | 10/2017 | Cartagena et al. | |
| 2018/0199424 | A1* | 7/2018 | Baek | H01L 22/00 |
| 2018/0210522 | A1* | 7/2018 | Jain | G06F 9/4893 |
| 2018/0324979 | A1* | 11/2018 | North | G06F 1/20 |
| 2019/0004575 | A1* | 1/2019 | Khatri | G06F 1/206 |
| 2019/0129498 | A1* | 5/2019 | Leung | G06F 1/3287 |
| 2020/0104573 | A1* | 4/2020 | Chen | G06F 3/011 |
| 2020/0225724 | A1* | 7/2020 | MacNamara | G06F 1/3287 |

FOREIGN PATENT DOCUMENTS

| | | |
|---|---|---|
| CN | 204189111 U | 3/2015 |
| CN | 105404366 A | 3/2016 |
| CN | 107145211 A | 9/2017 |
| CN | 108780342 A | 11/2018 |
| GB | 2540804 A | 2/2017 |
| WO | 2014/197731 A1 | 12/2014 |

OTHER PUBLICATIONS

Camponogara et al., "A Model Considering QoS for Real-Time Systems with Energy and Temperature Constraints", Brazilian Symposium on Computing Systems Engineering, Nov. 2014, 6 pgs.

* cited by examiner

STABILIZING PERFORMANCE OF PROCESSING DEVICES

BACKGROUND

Processors perform operations on an external data source in order to execute computer readable program code. Example processors include central processing units, graphics, video, tensor, neural, physics, and digital processing units, among others. Each of these may implement certain circuitry that employs a clock signal to pace operations executed by the processor.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
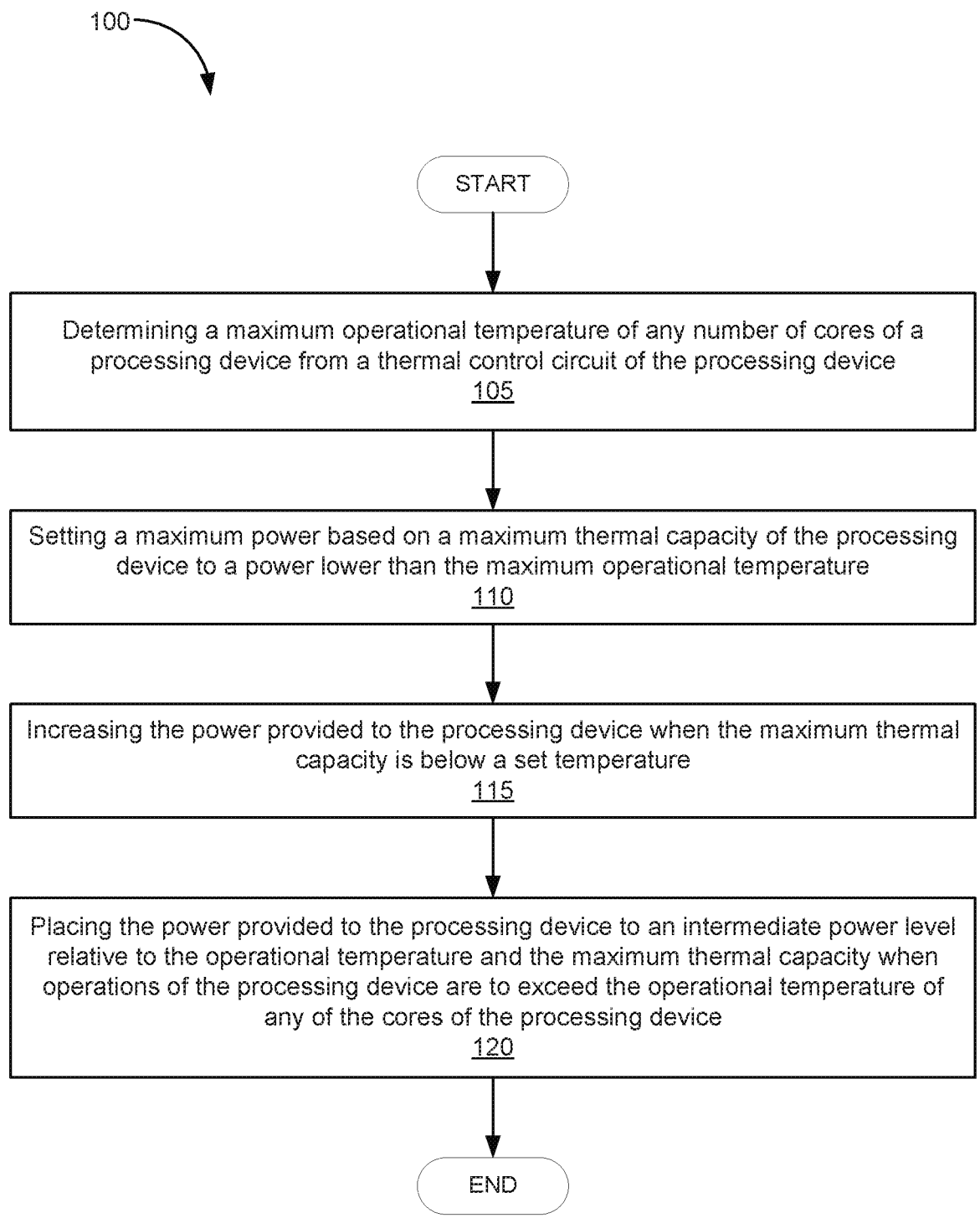
FIG. 1 is a flowchart depicting a method of stabilizing performance of a processing device according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Processing device receive and execute computer readable program code. The computer readable program code may be received from a data storage device external to the processing device. The processing device may also cause data to be cached in a cache or other storage device. During use, however, the energy provided to the processing device increases the heat produced by the processing device. If the heat exceeds a certain threshold, the processing device, itself, may be destroyed. Heat may be increased under a number of circumstances include lack of proper heat dissipation, overclocking, and buildup of dust on or near the processing device.

In order to prevent damage to the processing device from increases in heat, the processing device itself may include a thermal monitor that reads, in real-time, the temperature of the processing device and takes action so that the heat of the processing device does not exceed a threshold temperature. The thermal monitor may monitor a single or a plurality of cores within the processing device. In a particular example herein, the thermal monitor may be set to monitor for a threshold temperature that meets and/or exceeds a maximum thermal capacity set by a manufacturer of the processing device. The maximum thermal capacity may be set based on a predicted ambient temperature resulting from the capabilities of an associated heat dump on the processing device and may also be a function of the clock rate the processing device is or is requested to operate. Because faster clock rates increase the temperature (i.e., via power consumption) and because the thermal capacity of any given processing device, the maximum thermal capacity set by the manufacturer of the processing device may adhere to the following equation:

$$P = C * V^2 (a * f) \qquad \text{Eq. 1}$$

where "P" is the power provided to the processing device, "V" is the voltage of the energy provided to the processing device, "F" is the frequency (clock rate) measured in Hertz (Hz), "C" is a constant associated with the energy stored by a capacitor, and "a" is a constant.

However, the threshold temperature representing a maximum thermal capacity set by a manufacturer of the processing device may be set to a conservative temperature. This conservative temperature may be set at a lower temperature that the processing device can withstand so that the maximum temperature the processing device is capable of withstanding (i.e., a failure temperature) will not be reached. As a result, a temperature gap may be formed between the threshold temperature representing the maximum thermal capacity set by a manufacturer of the processing device and the actual maximum temperature the processing device may be capable of withstanding. Additionally, the threshold temperature representing the maximum thermal capacity set by a manufacturer of the processing device may leave room for the clock rate to be increased without damaging the processing device. Still further, the actual ambient temperature may be lower thereby allowing the heat sink associated with the processing device to be able to dissipate additional heat. This allows for higher clock rates without increases in the heat of the processing device beyond what was expected by the thermal monitor of the processing device. The present methods and systems described herein allow for additional processing output from the processing device that operates under manufacturer's temperature limits and/or clock rates while also preventing damage to the processing device. The present methods and systems described herein also provide for a processing device that has a relatively better performance for an end user as compared with other manufacturer's temperature and throttling methods.

The present specification describes a method of stabilizing performance of a processing device that includes determining a maximum operational temperature of any number of cores of a processing device from a thermal control circuit of the processing device; setting a maximum power based on a maximum thermal capacity of the processing device to a power lower than the maximum operational temperature; increasing the power provided to the processing device when the maximum thermal capacity is below a set temperature; and placing the power provided to the processing device to an intermediate power level relative to the operational temperature and the maximum thermal capacity when operations of the processing device are to exceed the operational temperature of any of the cores of the processing device.

The present specification also describes a method of operating a central processing unit that includes setting a maximum power provided to a central processing unit (CPU) lower than a maximum operational temperature based on a maximum thermal capacity of the CPU; increasing the power provided to the CPU when the maximum thermal capacity is below a set temperature and at a throttling state; and placing the power provided to the CPU to an intermediate power level relative to the operational temperature and the maximum thermal capacity when operations of the CPU are to exceed the operational temperature; and when the power provided to the CPU is increased, a throttling maximum thermal capacity is engaged to, for a boost period, overclock the CPU.

The present specification also describes a central processing unit (CPU) adaptive power controller that includes a CPU having a plurality of cores; a thermal capacity monitor to: determine a maximum operational temperature of any number of the plurality of cores of the CPU from a thermal control circuit of the CPU; and set a maximum power based on a maximum thermal capacity of the CPU to a power lower than the maximum operational temperature; and increase the power provided to the CPU when the maximum thermal capacity is below a set temperature; wherein, when the power provided to the CPU is increased, a throttling maximum thermal capacity is engaged to, for a boost period, overclock any of the number of plurality of cores.

Turning now to the figures, FIG. 1 is a flowchart depicting a method (100) of stabilizing performance of a processing device according to an example of the principles described herein. The processing device may be any type of processing device that may receive any type of data from a data storage device as input and provide output. The processing device may include any combination of electronic circuits to facilitate the processing that data. In an example, the processing device may form part of a computing device such as a server, a desktop computer, a laptop computer, a personal digital assistant (PDA), a mobile device, a smartphone, a gaming system, and a tablet, among other types of computing devices. To achieve its desired functionality, the computing device may include various hardware components. Among these hardware components may be the processing device described herein, a number of data storage devices, a number of peripheral device adapters, and a number of network adapters. These hardware components may be interconnected through the use of a number of busses and/or network connections. In one example, the processing device, data storage device, peripheral device adapters, and a network adapter may be communicatively coupled via a bus. In some of the examples presented herein, the processing device may be thermally and/or mechanically coupled to a heat dump. The heat dump may be used to transfer heat from the processing device to ambient so as to cool down the processing device. The rate at which the heat is transferred from the processing device to ambient may be determined at the time or manufacturing of the computing device. Such information, in an example, may be provided to the processing device for reference as to execute the functionality of the methods described herein.

As described herein, the processing device may include the hardware architecture to retrieve executable code from the data storage device and execute the executable code. The executable code may, when executed by the processor, cause the processor to implement the functionality described in connection with the methods of the present specification described herein. In the course of executing code, the processing device may receive input from and provide output to a number of the remaining hardware units. In a particular example described herein, data may be received and sent to a thermal control circuit to control the clock rate/temperature of the processing device. In an example, the thermal control circuit may be in the form of computer executable program code that is executed by the processing device itself or a separate processing device. In an example, the thermal control circuit may be in the form of an application specific integrated circuit (ASIC). This ASIC may be accessed by the processing device or be formed as part of the processing device such that, during operation of the processing device, the processing device may have access to information regarding, among other data, the heat transfer characteristics of the heat sink, data descriptive of an expected heat output of the processing device relative to the power consumption, and data descriptive of an expected heat output of the processing device relative to the clock rate of the processing device, among other types of data described herein.

The data storage device associated with the processing device may store data such as executable program code that is executed by the processing device. In an example, the data storage device may specifically store computer code representing a number of applications that the processing device executes to implement the functionality described herein. The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein.

The method (100) may include determining (105) a maximum operational temperature of any number of cores of a processing device from a thermal control circuit of the processing device. In an example, the maximum operational temperature associated with any of the given cores may be stored on a data storage device and/or maintained by the thermal control circuit as described herein. The maximum operational temperature may be a maximum operating temperature the processing device may withstand before it fails (i.e., failure temperature) due to overheating. In an alternative example, the maximum operational temperature may be some operating temperature that is less than the failure temperature of the processing device but larger than a manufacturer's operating temperature limit. A temperature gap, therefore, is created between the determined (105) maximum operational temperature and the manufacturer's operating temperature limit. The present specification describes operation of the processing device within the temperature gap despite the manufacturer's operating temperature limit.

During operation, the processing device and/or the thermal control circuit may determine (105) the maximum operational temperature of any given core. The thermal control circuit may, in real-time, monitor the heat of the processing device and may be used to determine if and when the operating temperature meets or is predicted to meet the maximum operational temperature. Again, the maximum operational temperature may be a temperature set by the manufacturer of the processing device and may be dependent on a number of factors including the hardware structure of the circuitry of the processing device and the types of materials used to form the processing device, among other factors. Regardless of the factors, however, the maximum operational temperature may be provided at the time of manufacture of the processing device and stored on a data storage device associated with the processing device.

The method (100) may include setting (110) a maximum power based on a maximum thermal capacity of the processing device to a power lower than the maximum operational temperature. As described herein in connection with equation 1 above, the power provided to the processing device may be related to the frequency in Hertz of the clock rate of the processing device. Because the data maintained by or accessible by the processing device includes data regarding the relationship between the maximum operational temperature and the power consumed by the processing device, the maximum thermal capacity may be determined by, for example, referring to a look-up table. In this example, the look-up table may include any number of relationships descriptive of the heat produced by the processing device under corresponding power consumption and, accordingly, clock rates.

The method (100) may continue with increasing (115) the power provided to the processing device when the maximum thermal capacity is below a set temperature. Because the processing device has accessed data associated with the thermal capacity of the processing device under certain circumstances (i.e., clock rates and heat dissipation capabilities of the heat sink), the power may be increased when a calculated thermal capacity has not reached the maximum operation temperature defined at manufacturing time of the processing device. In an example, the maximum thermal capacity of the processing device may be set to 35 degrees Celsius. In this example the clock rate may set to 4.6 Ghz without increasing the operating temperature of the processing device. Additionally, this results in a power consumption of 150 Watts of power. However, where the current operating temperature is below the maximum thermal capacity, the processor may be overclocked or additional power may be used by the processor to increase the speed of processing. This results in an increase in temperature, but this increase is not excessive to the point of reaching the maximum operational temperature.

The method may continue with placing (120) the power provided to the processing device to an intermediate power level relative to the operational temperature and the maximum thermal capacity when operations of the processing device are to exceed the operational temperature of any of the cores of the processing device. Thus, where the maximum thermal capacity is below a set temperature, the processor may operate at a higher clock rate while not being throttled. In the examples where the maximum thermal capacity is above the set temperature, normal throttling of the processing device may be implemented. However, with the method (100) described herein, the performance of the processing device may be stabilized resulting in better overall performance.

By way of example, the processing device may be set to have a maximum power set to be at 150 Watts. This may correspond to the processing device operating at 4.7 Ghz at a set temperature of 35 degrees Celsius. If the actual temperature or predicted temperature of the processing device is lower than 35 degrees Celsius, the processing device may have the capability to run at a relatively higher clock rate such as 4.9 Ghz. However, during a heavy loading process, the power to the processing device may be limited to the 150 Watts based on the set temperature. Where this is the case, the processing device's clock rate would usually drop back from 4.9 Ghz to 4.7 Ghz. With the method (100) described herein, the power to the processing device may be increased from 150 Watts to 170 Watts and keep the clock rate at 4.9 Ghz. This results in a relatively better average performance over time. Additionally, where the set temperature is higher than 35 degrees Celsius, the thermal capacity may be set to a lower power such as 130 Watts thereby preventing any throttling of the clock rate so as to keep the clock of the processing device running at 4.5 Ghz instead of being dropped to 4.3 Ghz.

Figure 2:
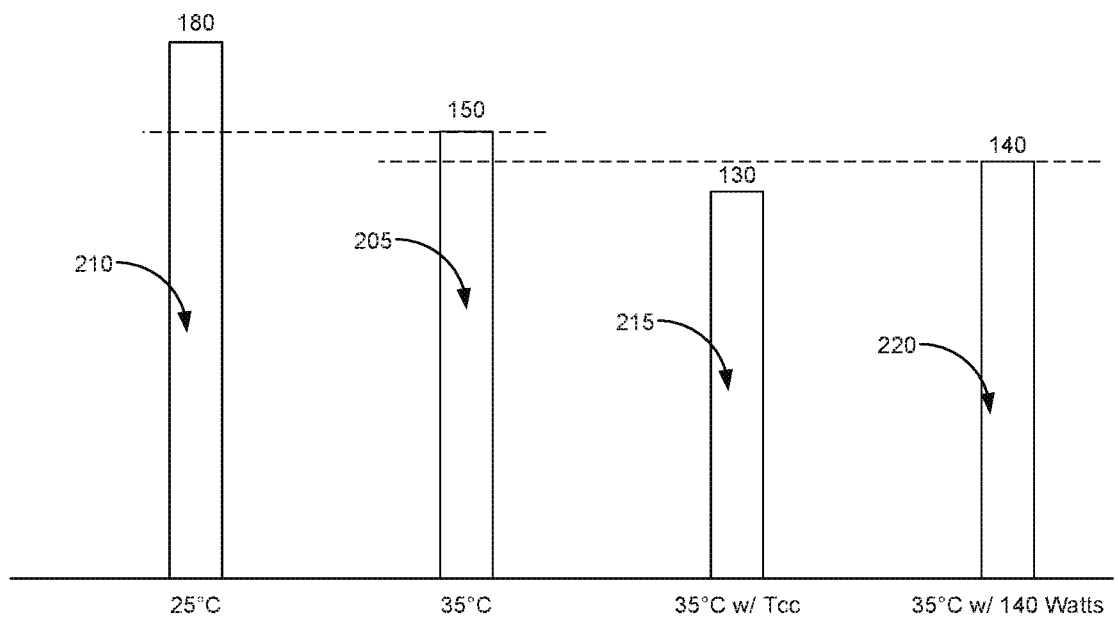
FIG. 2 is a graph showing the different possible states under different thermal capacity states according to an example of the principles described herein.

FIG. 2 is a graph showing the different possible states under different thermal capacity states according to an example of the principles described herein. As can be seen a first state (205) exists where, in this example, the set maximum thermal capacity is 35 degrees Celsius ambient temperature. Ambient temperature is that temperature the predicted temperature of the processing device at a given power level. Again, this ambient temperature may be defined by a look-up table or extrapolated from data about the processing device at the time of manufacture. Because different processing devices comprise different materials and characteristics, specific maximum operational temperatures, maximum powers, maximum thermal capacities, and set temperatures described herein are merely examples and the principles described in the methods and systems herein are merely examples. The power level (150 Watts) of the first state may be defined by the manufacturer of the processing device and results in a default clock rate of 4.6 Ghz. Thus, in this example, the maximum power based on a maximum thermal capacity that is set (110) is 150 Watts. However, at a second state (210) the power is increased to 180 Watts because the ambient temperature has been detected as being 25 degrees Celsius. Because the ambient temperature is lower, the thermal capacity of the processing device is increased allowing for a more power to be provided to the processing device. More power to the processing device results in relatively higher clock rates and, in this example, results in a clock rate of around 4.9 Ghz. As described herein, the processing device may operate beyond a pre-defined maximum power in order to take advantage of a lower ambient temperature situation.

Still further, the processing device may be set to a third state (215). In this state, a thermal control circuit offset (Tcc) trigger may be overridden based on temperature of the processing device and by the use of the method described herein. In previously manufactured systems, the Tcc may be triggered upon detection of a threshold processing device temperature, for example, 97 degrees Celsius or, in another example, between 90 and 99 degrees Celsius. Upon triggering of the Tcc threshold temperature in the previously manufactured systems, the processing device may stop working for a few milliseconds until the temperature drops below the threshold processing device temperature. Such a throttling cause significantly less power to be provided to the processor: in this example, 130 Watts. This state (215) results in significantly lower clock rates (i.e., 4.3 Ghz) even when the thermal capacity of the processing device drops to 140 Watts.

To alleviate the decrease in processing device performance when the Tcc threshold temperature is reached, the processing device may be set to a fourth state (220) when the thermal control circuit detects that the Tcc is or will be triggered. In this state (220), the thermal control circuit may place (120) the power provided to the processing device to an intermediate power level relative to the operational temperature and the maximum thermal capacity. In an example, the power provided to the processing device in this state (220) may be 140 Watts. By doing so, a maximum processing power of the processing device may be realized. Indeed, instead of allowing the processing device to be relegated to the third state (215), the processing device satisfies both the temperature thresholds and power thresholds that may be placed on the processing device. This method (100) and system, therefore, prevents damage to the processing device while still achieving, on average, better performance in the form of relatively consistent and higher clock rates.

Figure 3:
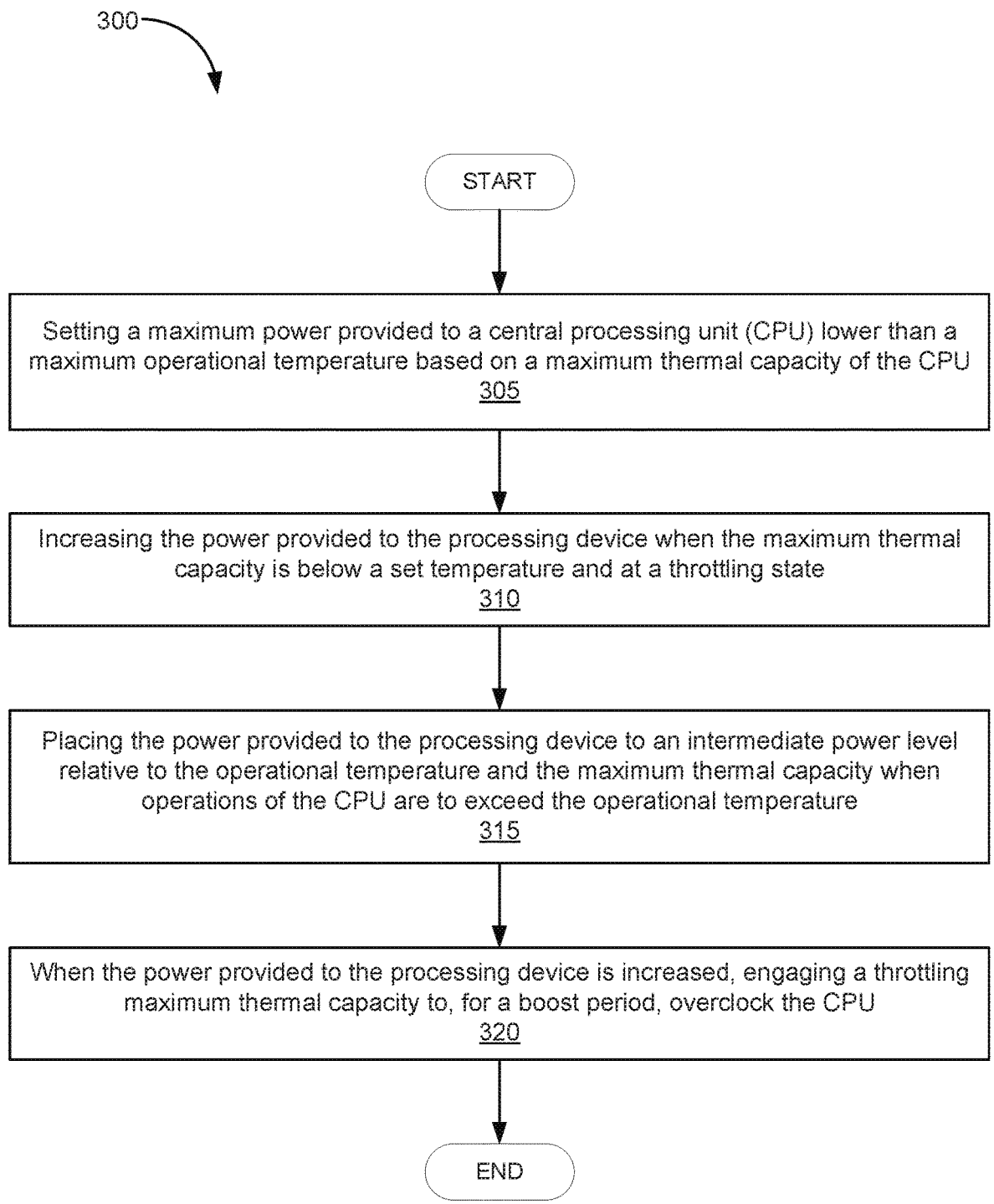
FIG. 3 is a flowchart depicting a method of operating a central processing unit (CPU) according to an example of the principles described herein.

FIG. 3 is a flowchart depicting a method (300) of operating a central processing unit (CPU) according to an example of the principles described herein. The method (300) may include setting (305) a maximum power provided to a central processing unit (CPU) lower than a maximum operational temperature based on a maximum thermal capacity of the CPU. The power provided to the CPU may then be increased (310) when the maximum thermal capacity is below a set temperature and at a throttling state. As described herein, the CPU may be subjected to two distinct restrictions after receipt from a manufacturer: a power limiter (i.e., setting a maximum thermal capacity of the CPU) and a thermal control circuit offset (Tcc) (i.e., setting a throttling temperature). The method (300) described herein, therefore, accommodates for these two restrictions while still maximizing the processing power of the CPU.

The method (300) may also include placing (315) the power provided to the processing device to an intermediate power level relative to the operational temperature and the maximum thermal capacity when operations of the CPU are to exceed the operational temperature. This is done such that, when the power provided to the CPU is increased, a throttling maximum thermal capacity may be engaged (320) to, for a boost period, overclock the CPU. In an example, this boost period may be 100 milliseconds. In an example, this boost period may be between 50 and 150 milliseconds. Because, in this example, the Tcc is triggered based on temperature data, overclocking, in some circumstances, of the CPU may not necessarily result in the Tcc threshold being met. In an example, the boost period is defined by an exponentially weighted moving average (EWMA) and may not be a fixed number across a number of different processing devices. In an example, the EWMA may be associated with a chart specific to any given processing device. By way of example, the EWMA chart may show that a processing device of 70° C. over a period of 30 seconds may result in a 10 second boost. In another example, the EWMA chart may show that a processing device shows that a temperature of the processing device is 95° C. has occurred in the past 30 seconds, such a situation may result to the 100 ms of boost period. Thus, the present specification contemplates that a EWMA be used with an accompanying chart, maintained on a data storage device, in order to determine the boost period descried herein.

Figure 4:
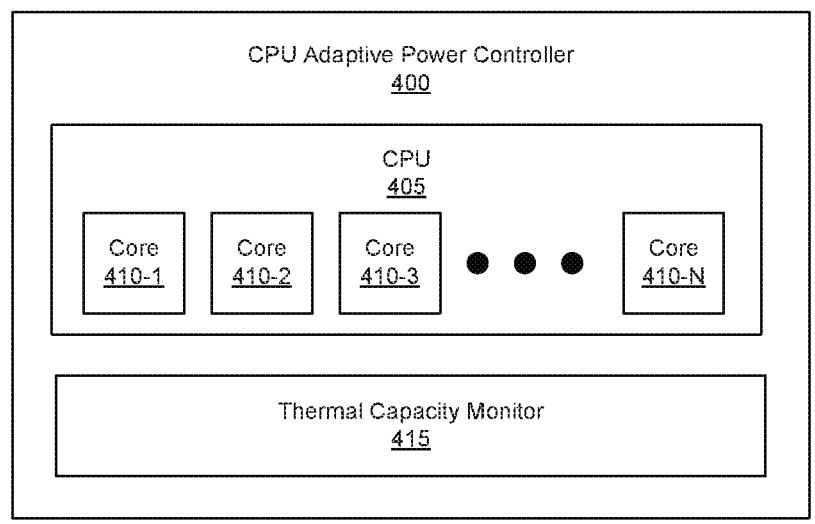
FIG. 4 is a block diagram of a central processing unit (CPU) adaptive power controller according to an example of the principles described herein.

FIG. 4 is a block diagram of a central processing unit (CPU) adaptive power controller (400) according to an example of the principles described herein. The CPU adaptive power controller (400) may include a CPU (405) that includes a plurality of cores (410-1, 410-2, 410-3, 410-N). The actual number of cores (410-1, 410-2, 410-3, 410-N) within the CPU (405) may vary and the present specification contemplates the use of any CPU (405) having any number of cores (410-1, 410-2, 410-3, 410-N) therein.

The CPU (405) may be may be any type of processing device that may receive any type of data from a data storage device as input and provide output. The processing device may include any combination of electronic circuits to facilitate the processing that data. In an example, the CPU (405) may form part of a computing device such as a server, a desktop computer, a laptop computer, a personal digital assistant (PDA), a mobile device, a smartphone, a gaming system, and a tablet, among other types of computing devices as described herein.

The CPU adaptive power controller (400) may further include a thermal capacity monitor (415). The thermal capacity monitor (415) may be communicatively coupled to the CPU (405) itself in order to receive input and send data to the CPU (405) to facilitate the processes and methods described herein. Examples of data that may be exchanged between the thermal capacity monitor (415) and the CPU (405) may include temperature data regarding each of the cores (410-1, 410-2, 410-3, 410-N) either as a group or individually and instructions to set the power provided to the CPU (405) according to the methods (100, 300) described herein.

The thermal capacity monitor (415) may be executed by the CPU (405) or other processing device to determine a maximum operational temperature of any number of the plurality of cores (410-1, 410-2, 410-3, 410-N) of the CPU (405) from a thermal control circuit of the CPU (405). The thermal capacity monitor (415) may also increase the power provided to the CPU when the maximum thermal capacity is below a set temperature and at a throttling state. Still further, the thermal capacity monitor (415) may further place the power provided to the CPU to an intermediate power level relative to the operational temperature and the maximum thermal capacity when operations of the CPU are to exceed the operational temperature. Additionally, the thermal capacity monitor (415) may, when the power provided to the CPU is increased, engage a throttling maximum thermal capacity to, for a boost period, overclock the CPU. Again, the boost period may be between 50 and 150 milliseconds or may be specific to an EWMA chart as described herein. In an example, the boost period may be 100 milliseconds. In an example, the maximum operational temperature may be between 90 and 110 degrees Celsius. In an example, the maximum operational temperature may be 97 degrees Celsius.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the CPU (405) of a computing device or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a method of stabilizing performance of a processing device and a CPU adaptive power controller to execute that method. The CPU adaptive power controller may increase the overall performance of the processing device it operates such that reductions in clock speed are not realized. This allows for the computing device to operate at a speed not realized without the execution of the methods described herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of stabilizing performance of a processing device, the method comprising:
   determining a maximum operational temperature of any number of cores of the processing device from a thermal control circuit of the processing device;
   determining a maximum thermal capacity of the processing device based on the maximum operational temperature;
   setting a first maximum power limit for the processing device based on the maximum thermal capacity of the processing device and based on a standard ambient temperature associated with the processing device;
   determining that a current ambient temperature associated with the processing device is lower than the standard ambient temperature;
   responsive to determining that the current ambient temperature associated with the processing device is lower than the standard ambient temperature, setting a second maximum power limit for the processing device, the second maximum power limit being greater than the first maximum power limit; and
   providing power to the processing device in accordance with the second maximum power limit such that the power provided to the processing device is greater than the first maximum power limit;
   determining that the current ambient temperature associated with the processing device is greater than the standard ambient temperature; and
   responsive to determining that the current ambient temperature associated with the processing device is greater than the standard ambient temperature, setting a third maximum power limit for the processing device, the third maximum power limit being lower than the first maximum power limit and being selected such that the processing device prevents throttling of a clock rate of the processing device.

2. The method of claim 1, wherein the maximum operational temperature is between 90 and 99 degrees Celsius.

3. The method of claim 1, comprising increasing a clock rate of any of the number of cores of the processing device in accordance with the second maximum power limit.

4. The method of claim 3, wherein increasing the clock rate of any of the number of cores of the processing device comprises increasing the clock rate of any of the number of cores of the processing device for a set period of time.

5. The method of claim 4, wherein the set period of time is 100 milliseconds.

6. The method of claim 4, comprising determining the set period of time based on an exponentially weighted moving average (EWMA).

7. The method of claim 1, wherein providing the power to the processing device in accordance with the second maximum power limit comprises providing the power to any of the number of cores independently from any remaining cores.

8. The method of claim 1, wherein:
   throttling of the clock rate of the processing device occurs when an operating temperature of the processing device reaches a throttling temperature; and
   the third maximum power limit is selected such that the operational temperature of the processing device does not reach the throttling temperature.

9. The method of claim 8, comprising:
   providing power to the processing device in accordance with the third maximum power limit such that the power provided to the processing device is lower than the third maximum power limit; and
   maintaining a clock rate of any of the number of cores of the processing device in accordance with the third maximum power limit.

10. A central processing unit (CPU) adaptive power controller, the CPU adaptive power controller comprising:
    a CPU having a plurality of cores; and
    a thermal capacity monitor to:
       determine a maximum operational temperature of any number of the plurality of cores of the CPU from a thermal control circuit of the CPU;
       determine a maximum thermal capacity of the CPU based on the maximum operational temperature;
       set a first maximum power limit for the CPU based on the maximum thermal capacity of the CPU and based on a standard ambient temperature associated with the CPU;
       determine that a current ambient temperature associated with the CPU is lower than the standard ambient temperature;
       responsive to determining that the current ambient temperature associated with the CPU is lower than the standard ambient temperature, setting a second maximum power limit for the CPU, the second maximum power limit greater than the first maximum power limit;
       cause power to be provided to the CPU in accordance with the second maximum power limit such that such that the power provided to the CPU is greater than the first maximum power limit;
       determine that the current ambient temperature associated with the CPU is greater than the standard ambient temperature;
       responsive to determining that the current ambient temperature associated with the CPU is greater than the standard ambient temperature, setting a third maximum power limit for the CPU, the third maximum power limit being lower than the first maximum power limit and being selected such that the CPU prevents throttling of the clock rate of the CPU; and
       provide power to the CPU in accordance with the third maximum power limit such that the power provided to the CPU is lower than the first maximum power.

11. A method of operating a central processing unit (CPU), comprising:
    setting a first maximum power limit for the CPU based on a maximum operational temperature, based on a standard ambient temperature associated with the CPU, and based on a maximum thermal capacity of the CPU;
    determining that a current ambient temperature associated with the CPU is lower than the standard ambient temperature;
    responsive to determining that the current ambient temperature associated with the CPU is lower than the standard ambient temperature, setting a second maximum power limit for the CPU, the second maximum power limit greater than the first maximum power limit;
    providing power to the CPU in accordance with the second maximum power limit such that the power provided to the CPU is greater than the first maximum power;
    increasing a clock rate of the CPU in accordance with the second maximum power limit for the CPU;

determining that the current ambient temperature associated with the CPU is greater than the standard ambient temperature;

responsive to determining that the current ambient temperature associated with the CPU is greater than the standard ambient temperature, setting a third maximum power limit for the CPU, the third maximum power limit being lower than the first maximum power limit and being selected such that the CPU prevents throttling of the clock rate of the CPU;

providing power to the CPU in accordance with the third maximum power limit such that the power provided to the CPU is lower than the first maximum power; and maintaining the clock rate of the CPU in accordance with the third maximum power limit for the CPU.

12. The method of claim 11, wherein the maximum operational temperature is 97 degrees Celsius.

13. The method of claim 11, wherein the maximum operational temperature is between 90 and 99 degrees Celsius.

14. The method of claim 11, wherein increasing the clock rate of the CPU in accordance with the second maximum power limit comprises increasing a clock rate of any of a number of cores within the CPU in accordance with the second maximum power limit.

15. The method of claim 14, wherein providing the power to the CPU in accordance with the second maximum power limit comprises providing the power to any of the number of cores independently from any remaining cores.

16. The method of claim 11, wherein increasing the clock rate of the CPU in accordance with the second maximum power limit comprises increasing the clock rate of the CPU for a set period of time.

17. The method of claim 7, wherein:
throttling of the clock rate of the CPU occurs when an operating temperature of the CPU reaches a throttling temperature; and
the third maximum power limit is selected such that the operational temperature of the CPU does not reach the throttling temperature.

18. The CPU adaptive power controller of claim 10, wherein:
throttling of the clock rate of the CPU occurs when an operating temperature of the CPU reaches a throttling temperature; and
the third maximum power limit is selected such that the operational temperature of the CPU does not reach the throttling temperature.

19. The CPU adaptive power controller of claim 10, wherein the thermal capacity monitor is to increase a clock rate of any of the number of cores of the CPU in accordance with the second maximum power limit for a set period of time.

20. The CPU adaptive power controller of claim 10, wherein the maximum operational temperature is 97 degrees Celsius.

* * * * *